United States Patent [19]
Bizot et al.

[11] Patent Number: 5,660,736
[45] Date of Patent: Aug. 26, 1997

[54] SODIUM SULFOXYLATE FORMALDEHYDE AS A BOILER ADDITIVE FOR OXYGEN SCAVENGING

[75] Inventors: Paul M. Bizot, Lisle; Bruce R. Bailey, Batavia, both of Ill.

[73] Assignee: Nalco Chemical Company, Naperville, Ill.

[21] Appl. No.: 667,662

[22] Filed: Jun. 21, 1996

[51] Int. Cl.$^6$ ............................................. C02F 1/20
[52] U.S. Cl. ................. 210/750; 210/757; 252/188.28; 252/391; 252/395; 422/14; 422/16
[58] Field of Search .................... 210/750, 757; 252/188.28, 392, 395, 389.53, 391; 422/14, 16, 19

[56] References Cited

U.S. PATENT DOCUMENTS

| | | | |
|---|---|---|---|
| 4,012,195 | 3/1977 | Noack | 252/389 R |
| 4,022,711 | 5/1977 | Noack | 252/392 |
| 4,026,664 | 5/1977 | Noack | 252/390 |
| 4,096,090 | 6/1978 | Noack | 252/390 |
| 4,269,717 | 5/1981 | Slovinsky | 210/750 |
| 4,363,734 | 12/1982 | Slovinsky | 210/750 |
| 4,968,438 | 11/1990 | Soderquist et al. | 210/750 |
| 5,073,270 | 12/1991 | Gallup et al. | 210/698 |
| 5,078,894 | 1/1992 | Horwitz et al. | 252/81 |
| 5,108,624 | 4/1992 | Bossler et al. | 210/750 |
| 5,258,125 | 11/1993 | Kelley et al. | 210/750 |

OTHER PUBLICATIONS

Kirk–Othmer Encyclopedia of Chemical Technology, Third Edition, Interscience Publishers, vol. 12, pp. 734–771.

*Primary Examiner*—Peter A. Hruskoci
*Attorney, Agent, or Firm*—Robert A. Miller; James J. Drake

[57] ABSTRACT

The invention is a method for removing dissolved oxygen from alkaline water which comprises adding to alkaline water containing dissolved oxygen an effective oxygen-scavenging amount of a water-soluble sulfoxylate. A preferred material is sodium formaldehyde sulfoxylate.

20 Claims, 1 Drawing Sheet

SODIUM SULFOXYLATE FORMALDEHYDE AS A BOILER ADDITIVE FOR OXYGEN SCAVENGING

FIELD OF THE INVENTION

The invention is a method for removing dissolved oxygen from alkaline water which comprises adding to alkaline water containing dissolved oxygen an effective oxygen-scavenging amount of a water-soluble sulfoxylate. A preferred material is sodium formaldehyde sulfoxylate.

BACKGROUND OF THE INVENTION

Efficient operation of boilers and other steam-run equipment requires chemical treatment of feedwater to control corrosion. Corrosion in such systems generally arises as a result of oxygen attack of steel in water supply equipment, pre-boiler systems, boilers, and condensate return lines. Oxygen attack of steel is exacerbated by the unavoidable high temperatures found in boiler equipment. Since acidic conditions also accelerate corrosion, most boiler systems are run in an alkaline environment.

The action of dissolved gases such as oxygen and carbon dioxide are two of the main factors that lead to feedwater system and boiler corrosion. In order to understand the role of dissolved gases in corrosion, one must understand the electrochemical nature of corrosion.

Corrosion processes involve reactions where one species is oxidized $$M \rightarrow M^{2+} + 2e^-$$

and another is reduced.

$$x + e^- \rightarrow x^-$$

In boiler systems the two species involved in the redox chemistry are typically two different metals, a metal and oxygen, or a metal and water. Under most conditions, oxidation of iron occurs.

$$Fe^0 \rightarrow Fe^{2+} + 2e^-$$

A current of electrons then flows from this anodic region to a point where reduction takes place. If oxygen is present, the cathodic reaction is $$O_2 + H_2O + 4e^- \rightarrow 4OH^-$$

In the absence of oxygen, water is reduced to hydrogen.

$$2H_2O + 2e^- \rightarrow H_2 + 2OH^-$$

Any agent that inhibits either the anodic or cathodic reaction will stop corrosion from occurring. Metal passivation, the formation of a protective oxide film, is one common example of a process that inhibits corrosion by blocking one of the electrochemical reaction pathways.

The severity of oxygen corrosion will depend on the concentration of dissolved oxygen in the water, water pH and temperature. As water temperature increases, corrosion in feed lines, heaters, boiler, steam and return lines made of iron and steel increases.

In most modern boiler systems, dissolved oxygen is handled by first mechanically removing most of the dissolved oxygen and then chemically scavenging the remainder. Mechanical degasification is typically carried out with deaerating heaters, which will reduce oxygen concentration to the range of 0.005–0.050 mg/L.

Chemical scavenging of the remaining dissolved oxygen is widely accomplished by treating the water with an oxygen scavenger, such as hydrazine or sodium sulfite. See, for example, the Kirk-Othmer Encyclopedia of Chemical Technology, Second Edition, Interscience Publishers, Volume 12, pages 734–771 in reference to hydrazine. As explained in Kirk-Othmer, hydrazine efficiently eliminates the residual oxygen by reacting with the oxygen to give water and gaseous nitrogen. In addition, hydrazine is a good metal passivator since it forms and maintains an adherent protective layer of magnetite over iron surfaces.

It is, however, widely recognized that hydrazine is an extremely toxic chemical. Kirk-Othmer reports that it is highly toxic and readily absorbed through the mouth, skin and respiratory system, and that permanent corneal damage may result from contact with the eye. Low doses may cause central nervous system depression and high doses may cause convulsions and other damaging side effects.

Among other approaches to the scavenging of oxygen in boiler systems include: carbohydrazones as disclosed in U.S. Pat. No. 5,258,125; gallic acid as disclosed in U.S. Pat. No. 4,968,438; carbohydrazide as disclosed in U.S. Pat. No. 4,269,717 and 1,3 dihydroxy acetone as disclosed in U.S. Pat. No. 4,363,734.

Thus, it is an object of this invention to provide oxygen scavenging treatments which scavenge oxygen and reduce corrosion rates of steel surfaces under typical boiler use conditions.

SUMMARY OF THE INVENTION

The invention is a method for removing dissolved oxygen from alkaline water which comprises adding to alkaline water containing dissolved oxygen an effective oxygen-scavenging amount of a water-soluble sulfoxylate. A preferred material is sodium formaldehyde sulfoxylate.

DESCRIPTION OF THE INVENTION

Figure 1:
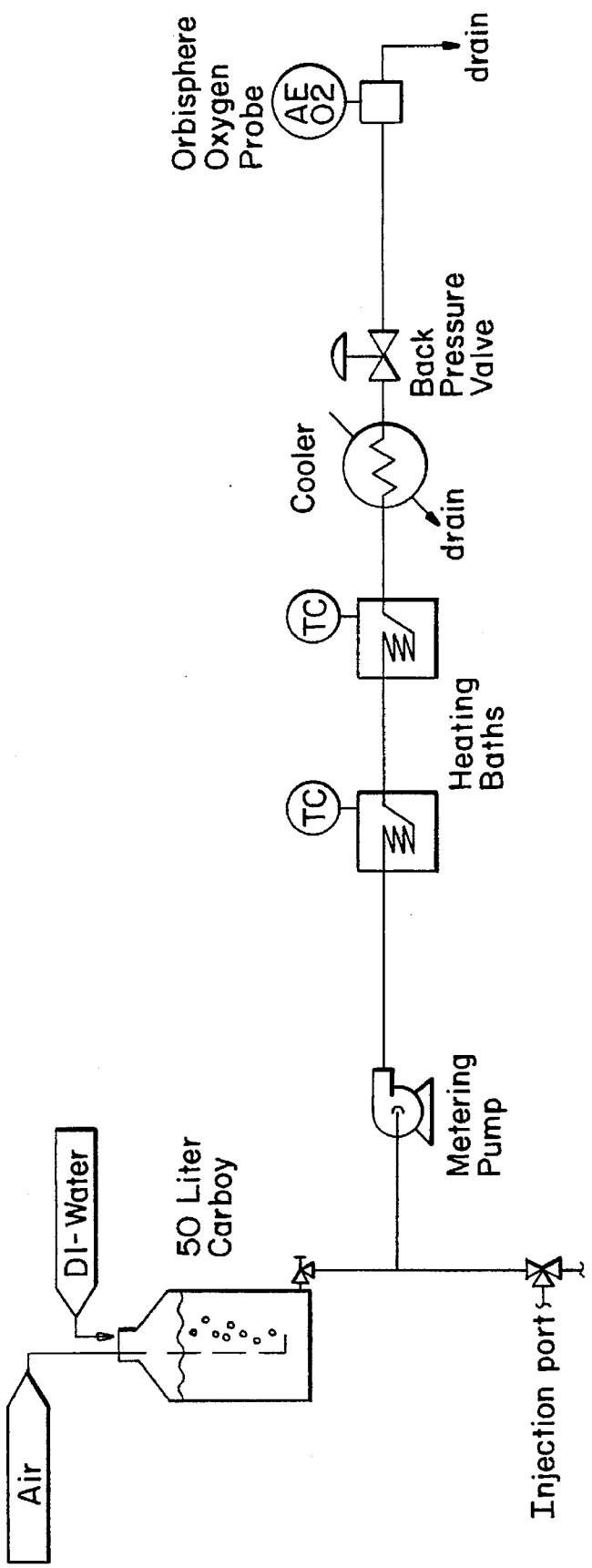
FIG. 1 is a schematic of a scavenger screening apparatus.

The invention is directed generally to reducing corrosion in boiler systems and more particularly to treating boiler water to remove dissolved oxygen.

The invention is a method for removing dissolved oxygen from alkaline water which comprises adding to alkaline water containing dissolved oxygen an effective oxygen-scavenging amount of a water-soluble sulfoxylate of the formula:

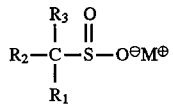

wherein M is selected from the group consisting of hydrogen, sodium, zinc, potassium, morpholine, cyclohexylamine, methoxypropylamine, diethylaminoethanol and diethyl hydroxylamine; and $R_1$, $R_2$ and $R_3$ are selected from the group consisting of hydrogen, hydroxyl, $C_1$–$C_6$ alkyl, benzyl, substituted benzyl, NH—$NH_2$, $NH_2$, and NH—OH.

The invention is also a method wherein the boiler water is subjected to deaeration to reduce the level of dissolved oxygen and the sulfoxylate is added to the boiler water after deaeration to remove remaining dissolved oxygen. For the practice of this invention, the sulfoxylate may be used with a catalyst capable of undergoing oxidation-reduction reactions. The catalyst may be selected from the group consisting of copper, cobalt, manganese, nickel, iron and combinations thereof. Organic materials such as hydroquinone may also be used as redox catalysts.

The invention is also a method for removing dissolved oxygen from alkaline water which comprises adding to alkaline water containing dissolved oxygen an effective oxygen-scavenging amount of a water-soluble sulfoxylate of the formula:

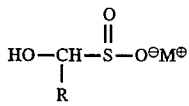

wherein M is selected from the group consisting of hydrogen, sodium, zinc, potassium, morpholine, cyclohexylamine, methoxypropylamine, diethylaminoethanol and diethyl hydroxylamine; and R is selected from the group consisting of hydrogen, $C_1$–$C_6$ alkyl, benzyl, and substituted benzyl. Preferably, M is sodium and R is hydrogen. The alkaline water may be boiler water. For the practice of this invention, from 0.5 to 10 moles of sulfoxylate per mole of dissolved oxygen are added to said water.

The invention is also a method wherein boiler water is subjected to deaeration to reduce the level of dissolved oxygen and the sulfoxylate is added to the boiler water after deaeration to remove remaining dissolved oxygen. The sulfoxylate may be used with a catalyst capable of undergoing oxidation-reduction reactions. The catalyst may be selected from the group consisting of copper, cobalt, manganese, nickel, iron and combinations thereof. Organic materials such as hydroquinone may also be used as redox catalysts.

The invention is also a method for removing dissolved oxygen from alkaline water which comprises adding to alkaline water containing dissolved oxygen an effective oxygen-scavenging amount of a water-soluble sulfoxylate of the formula:

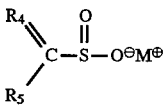

wherein M is selected from the group consisting of hydrogen, sodium, zinc, potassium, morpholine, cyclohexylamine, methoxypropylamine, diethylaminoethanol and diethyl hydroxylamine; $R_4$ is selected from the group consisting of N—$NH_2$, NH and N—OH; and $R_5$ is selected from the group consisting of NH—$NH_2$, and $NH_2$ and NH—OH. Preferably, $R_4$ is NH, $R_5$ is $NH_2$ and M is hydrogen. The alkaline water may be boiler water. For the practice of this invention, from 0.5 to 10 moles of sulfoxylate per mole of dissolved oxygen are added to said water.

The invention is also a method wherein the boiler water is subjected to deaeration to reduce the level of dissolved oxygen and the sulfoxylate is added to the boiler water after deaeration to remove remaining dissolved oxygen. The sulfoxylate may be used with a catalyst capable of undergoing oxidation-reduction reactions. The catalyst is selected from the group consisting of copper, cobalt, manganese, nickel, iron and combinations thereof. Organic materials such as hydroquinone may also be used as redox catalysts.

Although the sulfoxylate compounds may be added to the boiler system at any point, it is most efficient to treat the boiler feedwater, preferably as it comes from the degasifier. Residence times prior to steam formation should be maximized to obtain maximum corrosion protection. Sulfoxylate compounds will reduce oxygen and corrosion rates even at residence times are as low as 2–3 minutes.

The amount of sulfoxylate compound required to effectively scavenge oxygen from the boiler water is dependent upon the amount of oxygen actually present therein. It is generally desirable that at least 0.5 moles of sulfoxylate be used per mole of oxygen. These minimum levels of sulfoxylate compounds will have the added benefit of reducing general corrosion.

Sulfoxylate compounds are effective oxygen scavengers and also reduce general corrosion rates over the entire range of temperatures to which boiler water is generally subjected. Typically, these temperatures will lie in the range of 190°–350° F.

While sulfoxylate compounds may be used alone effectively in the present application, they may also have enhanced activity when catalyzed. For this purpose, it is desirable to employ catalysts which undergo redox reactions. Useful catalysts in the present application include cobalt, preferably in a stabilized form. The amount of cobalt used should be in the range of 0.2 to about 20% by weight of the sulfoxylate compound. Typical useful stabilized cobalt complexes are described in the following U.S. patents which are incorporated by reference: U.S. Pat. Nos. 4,012,195; 4,022,711; 4,026,664 and 4,096,090.

Copper (II) salts are also useful catalysts. As used herein, the term alkaline water refers to water with a pH of at least 8.

The following examples are presented to describe preferred embodiments and utilities of the invention and are not meant to limit the invention unless otherwise stated in the claims appended hereto.

EXAMPLE 1

The apparatus of FIG. 1 was utilized to evaluate the efficiency of various oxygen scavengers. Reference is made to FIG. 1. The feedstream was ambient temperature (22° C.) air-saturated deionized water. Air-saturation of the feedwater was maintained with a continuous purge with $CO_2$-free air. The pH of the feedwater was adjusted to within the range of 9.0–9.5 with reagent grade sodium hydroxide. All wetted parts were constructed from 316 stainless steel. Syringe infusion pumps were used for injection of scavenger and catalyst. A metering pump pressurized the flow to 85 psig. The first heating bath heated the water stream to about 214° F. in about 30 seconds. The water residence time in the second bath was 4.5 minutes, and the effluent temperature was 251° F. The water stream was cooled slightly below ambient temperature within a few seconds, the pressure was released, and the oxygen concentration of the effluent water was continuously monitored utilizing an Orbisphere oxygen probe.

The results are detailed in Table I. The lower the residual dissolved oxygen value, the more efficient the scavenger. Compound A is available from Aldrich Chemical Co. Compounds B–F are currently utilized for oxygen removal purposes. The scavengers B and F are commercially available compounds from Aldrich Chemical Company. Compound D is available from J. T. Baker Inc. Compound E is available from Lancaster Synthesis Inc. The Table illustrates that at two equivalents, the sodium sulfoxylate formaldehyde is more efficient than B–F. Further, with added catalysts such as cobalt and copper, efficiency is vastly increased.

An inorganic catalyst, typically copper or cobalt sulfate, was used if the scavenger showed negligible activity without catalyst. With the exception of hydroquinone, none of the currently commercial oxygen scavengers showed significant (greater than 5–10% oxygen removal) activity without catalyst within the limits of this test (5 minutes residence time at 250° F.). Sodium sulfoxylate formaldehyde is unique in this regard: it shows a high level of activity without catalyst, and its performance was markedly improved with the addition of catalyst.

TABLE 1

| Scavenger | Catalyst | Residual Dissolved Oxygen | | |
|---|---|---|---|---|
| | | $O_2$(ppm) for 1 equivalent scavenger | $O_2$(ppm) for 2 equivalents scavenger | $O_2$(ppm) for 4 equivalents scavenger |
| none | none | 8.3 | 8.3 | 8.3 |
| Sodium Sulfoxylate Formaldehyde | A | none | 2.4 | 0.045 | 0.026 |
| Sodium Sulfoxylate Formaldehyde | A | none | 2.4 | 0.045 | N/A |
| Hydroquinone | B | none | 1.3 | 0.10 | 0.095 |
| Sodium Sulfite | C | Cu | 0.5 | 0.13 | 0.12 |
| Diethyl Hydroxylamine | D | Cu | 2.7 | 0.14 | 0.13 |
| Methyl Ethyl Ketoxime | E | Co/Cu/Mn | <4.0 | <0.18 | N/A |
| Hydrazine | F | Cu | 2.8 | 0.22 | 0.20 |

EXAMPLE 2

The apparatus of FIG. 1 was utilized to evaluate the efficiency of various oxygen scavengers. Conductivity of the water was measured using a Myron L conductivity meter. The results of Table II illustrate that sodium sulfoxylate formaldehyde (SSF) results in less of an increase in water conductivity than do currently available treatments under typical boiler treatment conditions. The disadvantage of increased conductivity to a boiler water system is reduced cycles of operation, which results in increased blowdown rates and reduced boiler efficiency.

TABLE II

| Scavenger[1]/$O_2$ Equivalents Ratio | Conductivity (μS/cm) | | | |
|---|---|---|---|---|
| | Sulfite | Sodium Sulfoxylate Formaldehyde and caustic[3] | Sodium Sulfoxylate Formaldehyde and DEAE[2] | Sodium Sulfoxylate Formaldehyde |
| 1 | 138 | 65 | 54 | — |
| 1.5 | — | 124 | — | 53[4] |
| 2 | 225 | 166 | 74 | — |
| 3 | — | 238 | — | 74[4] |
| 4 | 402 | 327 | 131 | — |
| 6 | — | 470 | — | 130 |

[1]=Scavenger equivalence based on ambient temperature in air saturated water
[2]=Diethyl amino ethanol, 1:1 molar ratio to SSF
[3]=Sodium hydroxide, 1:1 molar ratio to SSF
[4]=calculated values

EXAMPLE 3

Corrosion rates of carbon steel were measured using ac impedance in a flow through cell at 400° F. in deaerated deionized water treated with sodium formaldehyde sulfoxylate or sodium sulfite. The oxygen concentration in the feedwater to the cell was about 40 ppb without any treatment and about 13 ppb with each of the treatments. The results of Table III illustrate that general corrosion rates of carbon steel with sodium formaldehyde sulfoxylate are about ⅓ that found for sodium sulfite. The data in Table III also illustrates that SSF is a more efficient oxygen scavenger than sodium sulfite, requiring only ⅔ the dosage to achieve the same oxygen reduction.

TABLE III

| Property Measured | Sodium Formaldehyde Sulfoxylate | Sodium Sulfite |
|---|---|---|
| (equivalents/$O_2$) | 0.67 | 1.0 |
| Corrosion rate (mpy) | 0.05 | 0.14 |

Changes can be made in the composition, operation and arrangement of the method of the present invention described herein without departing from the concept and scope of the invention as defined in the following claims:

I claim:

1. A method for removing dissolved oxygen from alkaline water having a temperature in the range of about 190°–350° F. which comprises adding to the alkaline water containing dissolved oxygen an effective oxygen-scavenging amount of a water-soluble sulfoxylate of the formula:

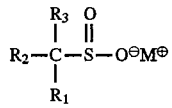

wherein M is selected from the group consisting of hydrogen, sodium, zinc, potassium, morpholine, cyclohexylamine, methoxypropylamine, diethylaminoethanol and diethyl hydroxylamine; and $R_1$, $R_2$ and $R_3$ are selected from the group consisting of hydrogen, hydroxyl, $C_1$–$C_6$ alkyl, benzyl, substituted benzyl, NH—$NH_2$, $NH_2$, and NH—OH.

2. The method of claim 1 wherein from 0.5 to 10 moles of sulfoxylate per mole of dissolved oxygen are added to said water.

3. The method of claim 1 wherein the alkaline water is boiler water.

4. The method of claim 3 wherein the boiler water is subjected to deaeration to reduce the level of dissolved oxygen and the sulfoxylate is added to the boiler water after deaeration to remove remaining dissolved oxygen.

5. The method of claim 1 wherein the sulfoxylate is used with a catalyst capable of undergoing oxidation-reduction reactions.

6. The method of claim 5 wherein the catalyst is selected from the group consisting of copper, cobalt, manganese, nickel, iron and combinations thereof.

7. A method for removing dissolved oxygen from alkaline water having a temperature in the range of about 190°–350° F. which comprises adding to the alkaline water containing dissolved oxygen an effective oxygen-scavenging amount of a water-soluble sulfoxylate of the formula:

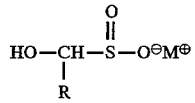

wherein M is selected from the group consisting of hydrogen, sodium, zinc, potassium, morpholine, cyclohexylamine, methoxypropylamine, diethylaminoethanol and diethyl hydroxylamine; and R is selected from the group consisting of hydrogen, $C_1$–$C_6$ alkyl, benzyl, and substituted benzyl.

8. The method of claim 7 wherein M is sodium and R is hydrogen.

9. The method of claim 7 wherein the alkaline water is boiler water.

10. The method of claim 9 wherein the boiler water is subjected to deaeration to reduce the level of dissolved oxygen and the sulfoxylate is added to the boiler water after deaeration to remove remaining dissolved oxygen.

11. The method of claim 7 wherein the sulfoxylate is used with a catalyst capable of undergoing oxidation-reduction reactions.

12. The method of claim 11 wherein the catalyst is selected from the group consisting of copper, cobalt, manganese, nickel, iron and combinations thereof.

13. The method of claim 7 wherein from 0.5 to 10 moles of sulfoxylate per mole of dissolved oxygen are added to said water.

14. A method for removing dissolved oxygen from alkaline water having a temperature in the range of about 190°–350° F. which comprises adding to the alkaline water containing dissolved oxygen an effective oxygen-scavenging amount of a water-soluble sulfoxylate of the formula:

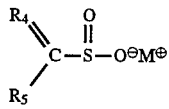

wherein M is selected from the group consisting of hydrogen, sodium, zinc, potassium, morpholine, cyclohexylamine, methoxypropylamine, diethylaminoethanol and diethyl hydroxylamine; $R_4$ is selected from the group consisting of N—$NH_2$, NH and N—OH; and $R_5$ is selected from the group consisting of NH—$NH_2$, $NH_2$ and NH—OH.

15. The method of claim 14 wherein $R_4$ is NH, $R_5$ is $NH_2$ and M is hydrogen.

16. The method of claim 14 wherein from 0.5 to 10 moles of sulfoxylate per mole of dissolved oxygen are added to said water.

17. The method of claim 14 wherein the alkaline water is boiler water.

18. The method of claim 17 wherein the boiler water is subjected to deaeration to reduce the level of dissolved oxygen and the sulfoxylate is added to the boiler water after deaeration to remove remaining dissolved oxygen.

19. The method of claim 14 wherein the sulfoxylate is used with a catalyst capable of undergoing oxidation-reduction reactions.

20. The method of claim 19 wherein the catalyst is selected from the group consisting of copper, cobalt, manganese, nickel, iron and combinations thereof.

* * * * *